United States Patent
Bernau et al.

(10) Patent No.: US 11,449,639 B2
(45) Date of Patent: Sep. 20, 2022

(54) DIFFERENTIAL PRIVACY TO PREVENT MACHINE LEARNING MODEL MEMBERSHIP INFERENCE

(71) Applicant: SAP SE, Walldorf (DE)

(72) Inventors: Daniel Bernau, Karlsruhe (DE); Jonas Robl, Heidelberg (DE); Philip-William Grassal, Heidelberg (DE); Florian Kerschbaum, Waterloo (CA)

(73) Assignee: SAP SE, Walldorf (DE)

( * ) Notice: Subject to any disclaimer, the term of this patent is extended or adjusted under 35 U.S.C. 154(b) by 664 days.

(21) Appl. No.: 16/442,336

(22) Filed: Jun. 14, 2019

(65) Prior Publication Data
US 2020/0394320 A1 Dec. 17, 2020

(51) Int. Cl.
*G06F 21/62* (2013.01)
*G06N 3/04* (2006.01)
*G06N 20/00* (2019.01)

(52) U.S. Cl.
CPC ......... *G06F 21/629* (2013.01); *G06N 3/0472* (2013.01); *G06N 20/00* (2019.01)

(58) Field of Classification Search
CPC combination set(s) only.
See application file for complete search history.

(56) References Cited

U.S. PATENT DOCUMENTS

2018/0004978 A1\* 1/2018 Hebert ................ G06F 16/2457
2020/0097763 A1\* 3/2020 Haerterich .......... G06N 3/0472

OTHER PUBLICATIONS

Bassily et al. (Private Empirical Risk Minimization: Efficient Algorithms and Tight Error Bounds, 2014 IEEE, pp. 464-473) (Year: 2014).*
Shokri et al. (Membership Inference Attacks Against Machine Learning Models, arXiv:1610.05820v2 [cs.CR] Mar. 31, 2017, 16 pages) (Year: 2017).*
Rollins (Foundational Methodology for Data Science, IBM, 2015, 6 pages) (Year: 2015).*

\* cited by examiner

*Primary Examiner* — Oleg Korsak
(74) *Attorney, Agent, or Firm* — Schwegman Lundberg & Woessner, P.A.

(57) ABSTRACT

Machine learning model data privacy can be maintained by training a machine learning model forming part of a data science process using data anonymized using each of two or more differential privacy mechanisms. Thereafter, it is determined, for each of the two or more differential privacy mechanisms, a level of accuracy and a level precision when evaluating data with known classifications. Subsequently, using the respective determined levels of precision and accuracy, a mitigation efficiency ratio is determined for each of the two or more differential privacy mechanisms. The differential privacy mechanism having a highest mitigation efficiency ratio is then incorporated into the data science process. Related apparatus, systems, techniques and articles are also described.

20 Claims, 7 Drawing Sheets

DIFFERENTIAL PRIVACY TO PREVENT MACHINE LEARNING MODEL MEMBERSHIP INFERENCE

TECHNICAL FIELD

The subject matter described herein relates to the use of differential privacy techniques to avoid membership inference to avoid data leakage.

BACKGROUND

Machine learning models are being increasingly adopted across different industries for a wide variety of applications to facilitate automated and intelligent classification and decision making.

SUMMARY

In a first aspect, machine learning model data privacy can be maintained by training a machine learning model forming part of a data science process using data anonymized using each of two or more differential privacy mechanisms. Thereafter, it is determined, for each of the two or more differential privacy mechanisms, a level of accuracy and a level precision when evaluating data with known classifications. Subsequently, using the respective determined levels of precision and accuracy, a mitigation efficiency ratio is determined for each of the two or more differential privacy mechanisms. The differential privacy mechanism having a highest mitigation efficiency ratio is then incorporated into the data science process.

The mitigation efficiency ratio can be defined as φ and can be based on changes in accuracy and precisions of the machine learning model. With such a variation:

$$\varphi = \frac{\frac{\text{largest change accuracy} - \text{actual change accuracy}}{\text{largest change accuracy}}}{\frac{\text{largest change precision} - \text{actual change precision}}{\text{largest change precision}}}$$

A first of the two or more differential privacy mechanisms can include local differential privacy (LDP). The LDP can be realized using local randomizers. The LDP can anonymize the training data prior to its being used to train the machine learning model.

A second of the two or more differential privacy mechanisms can include differential privacy stochastic descent gradient (DP-SGD). The DP-SGD can anonymize the training data while it is being used to train the machine learning model.

The data science process can include an automated sequence of stages including a business understanding stage, a privacy negotiation stage, a data understanding stage, a data preparation stage, a modeling stage, an evaluation stage, and a deployment stage. The differential privacy mechanism having a highest mitigation efficiency ratio can be automatically incorporated into the data science process.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter allows for the obfuscating of data used in training machine learning models to avoid issues associated with data leakage including membership inference.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
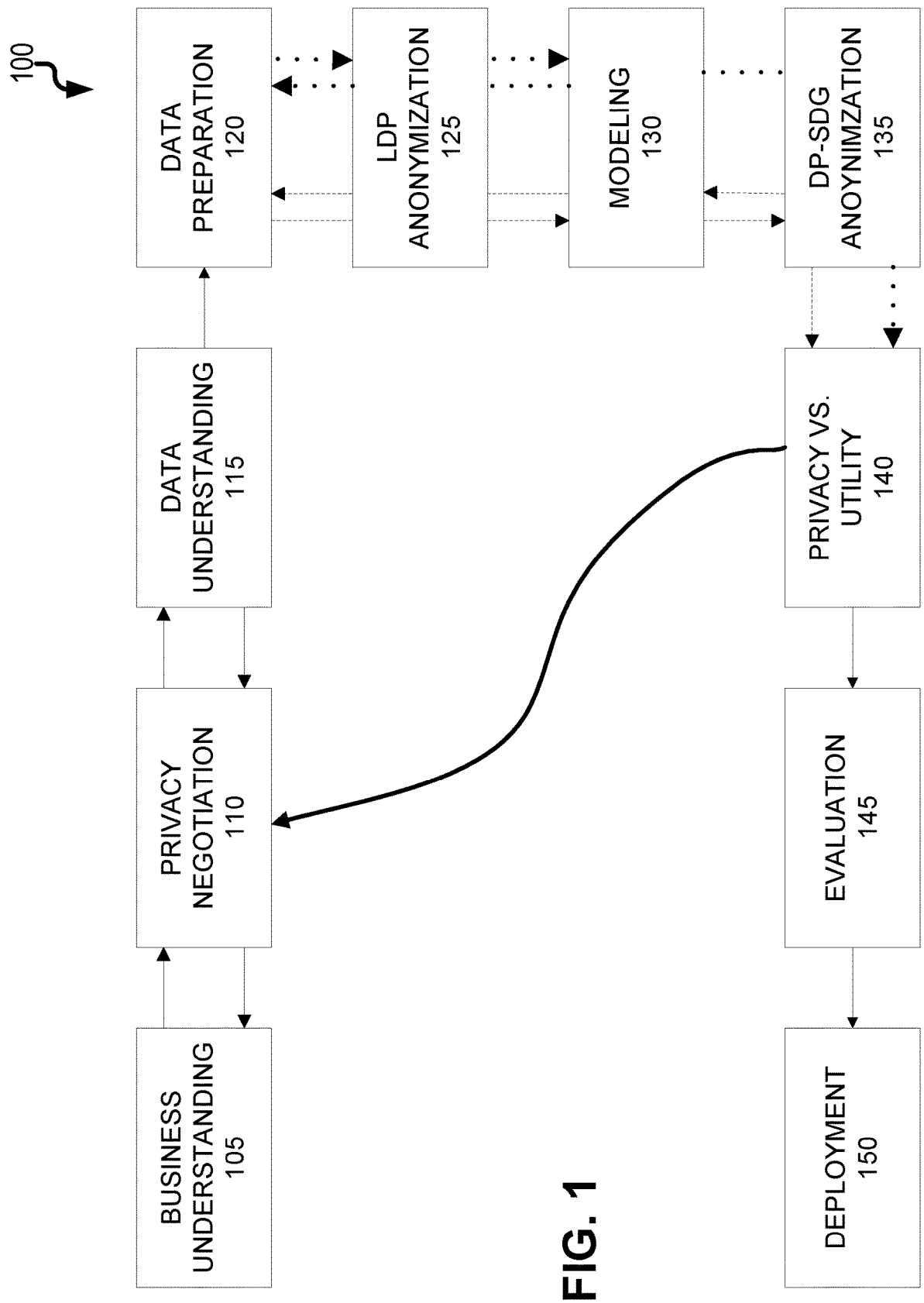
FIG. 1 is a process flow diagram illustrating a data science process.

The project leading to this application has received funding from the European Union's Horizon 2020 research and innovation programme under grant agreement No 825333.

The ability of machine learning prediction techniques to accurately fit complex functions has led to widespread adoption by data scientists. Neural networks (NN), in particular, have impacted various fields of application (e.g., image segmentation and classification, text analysis) because currently available computational resources allow for rapid training of such models. Typically, a neural network for discrimination among discrete classes is represented by a function $f: \mathbb{R}^N \rightarrow \{0, \ldots, k\}$, mapping from a multidimensional feature space to a finite set of labels (i.e., classes). As the true mapping function $f^*$ is not known, $f$ must be derived by approximating the true mapping based on training data where features and corresponding classes are known. To improve the mapping $f$ predefined coefficients (weights) $\theta$ in the calculation of $f$ can be altered in order to minimize the difference between $f^*$ and $f$. To find the optimal choice for $\theta$, numerical optimization, techniques (optimizers) can iteratively loop over the training data and update the values of $\theta$ accordingly. The steps of preparing the training data, designing $f$ learning $\theta$, evaluating and deploying $f$ are orchestrated in various data science processes.

Yet, privacy concerns are emerging since NNs tend to leak information about the underlying training dataset which can be exploited by an adversary. Leveraging this information to identify individuals in the training data is known as membership inference (MI). Training anonymized neural networks with Differential Privacy (DP) as provided herein can mitigate MI. However, selecting among available DP mechanisms and interpreting the privacy guarantee ($\epsilon$, $\delta$) is challenging as DP can be enforced at multiple points in the data science process by different DP mechanisms. Furthermore, balancing the trade-off between utility for the analyst and privacy for the data owner is difficult due to the inherent complexity of the DP guarantee.

The current subject matter provides techniques that can identify appropriate DP mechanisms to protect against malicious actors including MI attacks. In particular, the current subject matter provides $\varphi$, a ratio expressing the efficiency of protection strategies in terms of privacy and utility. In addition, the current subject matter considers different steps at which DP may be enforced.

Differential privacy is a technique for the anonymization of data. DP perturbs the result of a query function $f(\bullet)$ over a dataset $\mathcal{D}$ s.t. it is no longer possible to confidently determine whether $f(\bullet)$ was evaluated on $\mathcal{D}$, or some neighboring dataset $\mathcal{D}'$ differing in one individual. Mechanisms $\mathcal{M}$ fulfilling Definition 1 are differentially private and used for perturbation of $f(\bullet)$.

Definition 1. A mechanism $\mathcal{M}$ gives ($\epsilon$, $\delta$)-Differential Privacy if for all $\mathcal{D}$, $\mathcal{D}' \subseteq \mathcal{D}$ $\mathcal{O}$ $\mathcal{M}$ differing in at most one element, and all outputs $\mathcal{S} \subseteq \mathcal{R}$ $\Pr[\mathcal{M}(\mathcal{D}) \in \mathcal{S}] \leq e^\epsilon \cdot \Pr[\mathcal{M}(\mathcal{D}') \in \mathcal{S}] + \delta$.

$\epsilon$-DP can be defined as ($\epsilon$, $\delta=0$)-DP and the application of a mechanism $\mathcal{M}$ to a function $f(\bullet)$ can be referred to as output perturbation. DP holds for all possible differences $f(\mathcal{D}) - f(\mathcal{D}')$ by adapting to the global sensitivity of $f(\bullet)$ per Definition 2.

Definition 2 (Global $P_2$ Sensitivity). Let $\mathcal{D}$ and $\mathcal{D}'$ be neighboring. The global $P_2$ sensitivity of a function $f$, denoted by $\Delta f$, can be defined as $\Delta f = \max_{\mathcal{D}, \mathcal{D}'} \|f(\mathcal{D}) - f(\mathcal{D}')\|_2$.

For output perturbation, a differentially private stochastic gradient descent (DP-SGD) can be utilized which perturbs gradients with the Gaussian mechanism of Definition 3. DP-SGD bounds $\Delta f$ by clipping norm C and adds noise to all gradient components.

Definition 3. Let $\epsilon \in (0, 1)$ be arbitrary. For $$c^2 > 2\ln\left(\frac{1.25}{\delta}\right),$$

the Gaussian mechanism with parameter $$\sigma \geq c\frac{\Delta f}{\epsilon} \text{ is } (\epsilon, \delta)$$

-differentially private, adding noise scaled to $\mathcal{N}(0, \sigma^2)$.

For DP-SGD the moments accountant of Theorem 1 measures privacy decay. The accountant considers neural network update steps T, lot size L and training dataset size n. By sampling data per invocation with ratio q, $\epsilon$ can be further lowered.

Theorem 1. There exist constants $c_1$ and $c_2$ so that given the sampling probability $$q = \frac{L}{n}$$

and the number of steps T, for any $\epsilon < c_1 q^2 T$, the algorithm for deep learning with Differential Privacy is ($\epsilon$, $\delta$)-differentially private for any $\delta > 0$ if it is chosen as $$\sigma \geq c_2 \frac{q\sqrt{T\ln\left(\frac{1}{\delta}\right)}}{\epsilon}.$$

The replacement of an entry $d \in \mathcal{D}$ can be referred to as local differential privacy (LDP). In some variations, LDP can be realized by using local randomizers $\mathcal{LR}$.

Definition 4 (Local Randomizer). An $\epsilon$-local randomizer $\mathcal{LR}: \mathcal{S} \rightarrow \mathcal{S}$ is an $\epsilon$-differentially private algorithm, where $\epsilon \geq 0$, that takes a database of size n=1. That is, $\Pr[\mathcal{LR}(v)=s] \leq e^\epsilon \cdot \Pr[\mathcal{LR}(v')=s]$ for all possible inputs v, v'$\in \mathcal{S}$ and all possible outcomes $s \in \mathcal{S}$ of $\mathcal{LR}$. The probability can be taken over the coins of $\mathcal{LR}$.

A series of $\mathcal{LR}$ executions can compose a local algorithm $\mathcal{LA}$ according to Definition 5. $\epsilon$-local algorithms are $\epsilon$-differentially private.

Definition 5 (Local Algorithm). An algorithm is $\epsilon$-local if it accesses the database $\mathcal{D}$ via $\mathcal{LR}$ with the following restriction: for all $i \in \{1, \ldots, |\mathcal{D}|\}$, if $\mathcal{LR}_1(i), \ldots, \mathcal{LR}_k(i)$ are the algorithms invocations of $\mathcal{LR}$ on index i, where each $\mathcal{LR}_j$ is an $\epsilon_j$-local randomizer, then $\epsilon_1 + \ldots + \epsilon_k \leq \epsilon$.

Randomized response can be used with LDP to achieve $\epsilon = \ln(3)$ for a one-time collection of values from binary domains (e.g., {yes, no}) with two fair coins. That is, retention of the original value with probability $\rho = 0.5$ and uniform sampling with probability $1-\rho$:

$$\epsilon = \ln\left(\frac{\rho + (1-\rho) \cdot \rho}{(1-\rho)^2}\right) = \ln\left(\frac{Pr[\text{yes} \mid \text{yes}]}{Pr[\text{yes} \mid \text{no}]}\right). \quad (1)$$

As of Proposition 1 DP is immune to post-processing, i.e., the attempt to weaken DP by applying a function $\mathcal{F}$ to the output of $\mathcal{M}$.

Table 1 provides a brief overview of the notations used herein.

TABLE 1

Notations and context

| Symbol | Description |
|---|---|
| X | Set of vectors $x_1, \ldots, x_j$ where $x_j^1 \ldots x_j^i$ denote attribute values (features) of $x_j$. |
| Y | Set of k target variables $Y_1, \ldots, Y_k$ (labels). |
| C | $|Y|$. |
| y | Vector of target variables (labels) where variable $y_j \in y$ represents the label for $x_j \in X$. |
| ŷ | Predicted target variable, i.e., $ŷ = f(x)$. |
| p(x) | Softmax vector for a sample x representing a confidence distribution over all classes Y which is usually computed before outputting the class with the highest confidence assigned. |
| $\mathcal{D}$ | $\mathcal{D} := (X, y)$. |
| d | A record $d \in \mathcal{D}$, where $d := (x, y)$. |
| n | $|\mathcal{D}_{target}^{train}|$. |

Proposition 1 (Post-Processing). Let $\mathcal{M}: S \rightarrow \mathcal{R}$ be a mechanism that is $(\epsilon, \delta)$-differentially private. Let $\mathcal{F}: \mathcal{R} \rightarrow \mathcal{R}'$ be an arbitrary randomized mapping. Then $\mathcal{F} \circ \mathcal{M}: S \rightarrow \mathcal{R}'$ is $(\epsilon, \delta)$-differentially private.

MI attacks aim to determine the presence or absence of an individual in a dataset $\mathcal{D}$ with the help of statistics on the dataset. While there are numerous types of MI attacks, the current subject matter is directed to white-box MI where an adversary $\mathcal{A}$ has access to input and output, and general hyper-parameters, of a model. Within three steps, the MI attack exploits that a ML classifier tends to classify a record d from the model's training dataset $\mathcal{D}_{target}^{train}$ with higher certainty p(x) to its true label y in comparison to a record $d \notin \mathcal{D}_{target}^{train}$.

Figure 2:
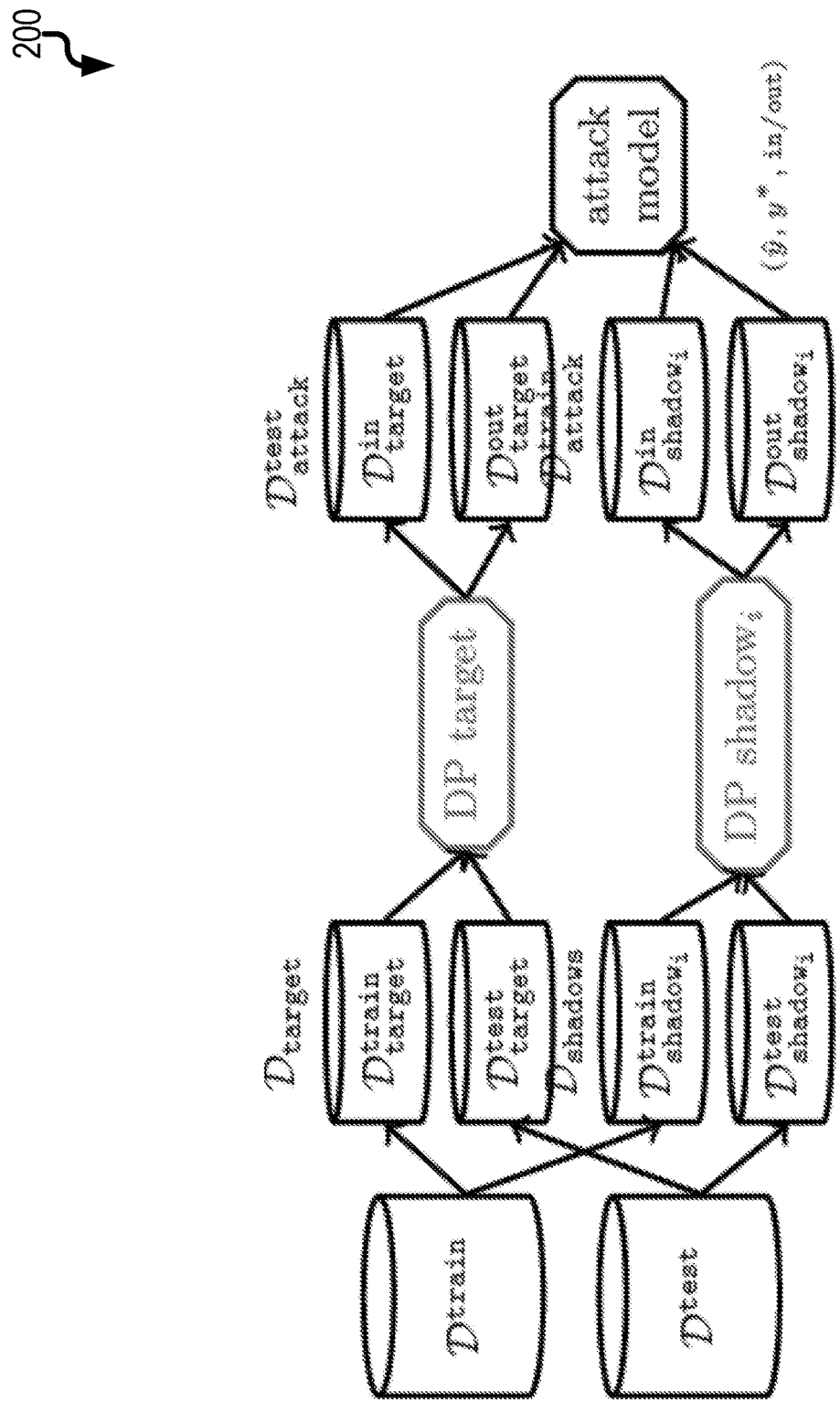
FIG. 2 is a diagram illustrating membership inference under differential privacy stochastic gradient descent (SGD)

With reference to diagram 200 of FIG. 2, First, data owner $\mathcal{DO}$ trains a ML model, target model, for some classification task with records from a dataset $\mathcal{D}_{target}^{train}$. After training $\mathcal{DO}$ exposes the target model. Second, $\mathcal{A}$ trains copies of the target model, shadow models, on data statistically similar to $\mathcal{D}_{target}^{train}$. If $\mathcal{A}$ has white-box access to the target model, i.e., knows hyper-parameters and structure, the shadow models mimic the target model. Alternatively, in black-box access, $\mathcal{A}$ invokes shadow models by calling the same training routine as the DO (e.g., by using a Machine-Learning-as-a-Service provider, etc.) and is limited to model input and output. It applies that $|\mathcal{D}_{shadow_i}^{train}|=|\mathcal{D}_{shadow_i}^{test}| \wedge \mathcal{D}_{shadow_i}^{train} \cap \mathcal{D}_{shadow_j}^{train} = \emptyset \wedge |\mathcal{D}_{shadow_i} \cap \mathcal{D}_{shadow_j}| \geq 0$ for any $i \neq j$. After training, each shadow model predicts $p(x), \forall d \in \{\mathcal{D}_{shadow_i}^{train}, \mathcal{D}_{shadow_i}^{test}\}$. As $\mathcal{A}$ has full control over $\mathcal{D}_{shadow_i}^{train}$ and $\mathcal{D}_{shadow_i}^{test}$, each shadow model's output (p(x), y) is attached with label "in" if the corresponding $d \notin \mathcal{D}_{shadow_j}^{train}$. Otherwise, the label is "out". The resulting triples (p(x), y, in/out) are used by $\mathcal{A}$ to train the attack model, i.e., $\mathcal{D}_{attack}^{train}$. Third, a binary classifier, attack model, is trained by $\mathcal{A}$ to exploit the imbalance between predictions on $d \notin \mathcal{D}_{target}^{train}$ and $d \notin \mathcal{D}_{target}^{train}$. One attack model can be trained per target variable $Y_k$ to map p(x), to the indicator "in" or "out". The attack model is tested on tuples (p(x), ŷ) outputted by the trained target model $\forall d \in \mathcal{D}_{target}^{train}$, which simulates the critical case where $\mathcal{A}$ tests membership for all training instances.

As mentioned above, the current subject matter provides enhanced techniques for providing and automating guidance for data scientists in building differentially private neural networks and mitigating MI along a data science (DS) process. FIG. 1 is a diagram illustrating a data science process in which the data owner $\mathcal{DO}$ can perform certain activities including:

Engaging in business understanding, and deriving data analysis approaches (105).

Striving for data understanding and identifying data quality issues (115).

Engaging in data preparation to construct inputs for data analysis (120).

Modeling (i.e., training) a set of data analysis algorithms such as NNs (130).

Evaluating data analysis algorithms with regard to accuracy (145).

Deploying the best model for practical use and presenting the results (15).

In addition, various other operations can take place within the process flow 100 of FIG. 1 to integrate data privacy into a data science process. When using DP in the DS process, utility and privacy are of particular interest. The current subject matter assesses utility in relation to changes in target model test accuracy under DP, which is denoted as $\mathcal{DO}$ test accuracy herein. In particular, privacy can be evaluated based on the stage at which DP is enforced in the DS process how such DP affects $\mathcal{A}$'s MI attack. This endeavor can also focus on privacy questions such as "How many records predicted as in are truly contained in the training dataset?" (i.e., precision). Effective mitigation reduces $\mathcal{A}$'s MI precision without losing a significant amount of $\mathcal{DO}$'s test accuracy.

First, independent of the specific DP mechanism for anonymization of data, an acceptable MI precision can be defined after business understanding 110, which can be referred to herein as privacy negotiation 110. Second, $\mathcal{DO}$ can either enforce anonymization with LDP after data preparation (125) or anonymization during model training with DP-SGD (135). Either approach is then automatically evaluated with regard to MI precision for a vector of DP privacy guarantees $(\epsilon, \delta)$. Meaning, that multiple instances of the process operations 120-140 can exist (per LDP and DP-SGD $(\epsilon, \delta)$ parameter). Finally, after the DP enforcements, a new operation 140 can be provided that captures the input from the process instances 120-140 for interpreting privacy and utility of trained models before actual evaluation and deployment to production. This privacy vs. utility operation 140 can be used to identify which privacy parameters $(\epsilon, \delta)$ efficiently address MI precision while maintaining high model accuracy. If the privacy parameters necessary for reaching the desired MI precision are inefficient, then the process can return to the privacy negotiation operation 110.

MI mitigation efficiency can be modeled as the relative difference between $\mathcal{DO}$'s change in test accuracy to the change in $\mathcal{A}$'s MI precision. Let $prec_{orig}$ be $\mathcal{A}$'s original MI precision and $acc_{orig}$ be $\mathcal{DO}$'s original test accuracy, and let $prec_{(\epsilon,\delta)}$ be $\mathcal{A}$'s MI precision and $acc_{(\epsilon,\delta)}$ be $\mathcal{DO}$'s test accuracy after mitigation with DP. Also, let $acc_{base}$ be the minimal $\mathcal{DO}$'s test accuracy and $prec_{base}$ be the minimal $\mathcal{A}$'s MI precision (e.g., random guessing). Normalizing yields mitigation efficiency $\varphi$:

$$\varphi = \frac{\left(\frac{\text{largest change accuracy} - \text{actual change accuracy}}{\text{largest change accuracy}}\right)}{\left(\frac{\text{largest change precision} - \text{actual change precision}}{\text{largest change precision}}\right)} = \qquad (2)$$

-continued $$\frac{\frac{(acc_{orig} - acc_{base}) - (acc_{orig} - acc(\epsilon, \delta))}{acc_{orig} - acc_{base}}}{\frac{(prec_{orig} - prec_{base}) - (prec_{orig} - prec(\epsilon, \delta))}{prec_{orig} - prec_{base}}} \quad 5$$

(2) requires (largest change−actual change)≠0⊇ and largest change≠0. If the previous is not given, the question of mitigation efficiency does not apply since $\mathcal{DO}$'s test accuracy or $\mathcal{A}$'s MI precision is foregone. From now on we assume that ($\varphi$ is well defined. $\varphi$ reaches its maximum when the change in accuracy is close to 0 (i.e., numerator≈1) and the change in precision is close to the maximum (i.e., denominator,≈0). Desirable $\varphi$>1 state that there is an efficient trade between privacy and utility, i.e., that the relative losses of $\mathcal{A}$ exceed $\mathcal{DO}$'s. This work analyzes the privacy guarantee $$\left(\epsilon, \delta = \frac{1}{n}\right) \text{ for } DP\text{-}SGD,$$

and the privacy guarantee ($\epsilon$, $\delta$=0) for LDP. Below is an analysis of $\varphi$ along customer transaction matrices for association rule learning. Due to the low domain, customer transaction matrices are suited for the application of LDP during the data preparation phase of the DS process and DP-SGD during the model training phase.

For association rule learning tasks where potentially high dimensional datasets (e.g., customer shopping carts representing purchases) are transformed to small domains with few distinct values LDP is an alternative to DP-SGD, and a comparison of privacy and utility between the two means is necessary. Therefore, LDP and DP-SGD can be evaluated and compared with regard to purchase data where the DS process is as follows: a model (artificial neural network) is provided a set of historical data labeled with customer groups. After training the model assigns new shopping carts to a customer group. To achieve DP for the $\mathcal{DO}$, the scheme introduced in diagram 200 of FIG. 2 can be followed to evaluate increasing privacy guarantees $\epsilon \in \{8.41, 3.72, 2.39, 1.77, 0.87\}$ and $\delta$=1/(n=10,000). To ensure better comparison to the later LDP experiments, in one example, the number of epochs can be fixed at 200.

Figure 3:
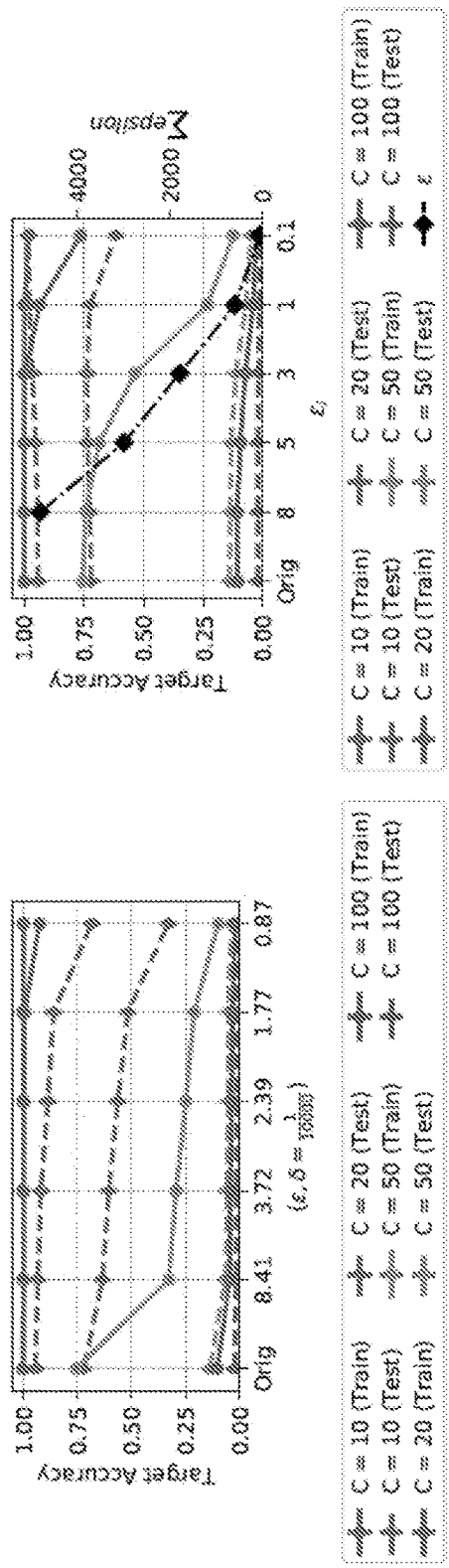
FIG. 3 includes a first diagram illustrating model accuracy using differential privacy stochastic gradient descent and a second diagram illustrating model accuracy using local differential privacy.
Figure 4:
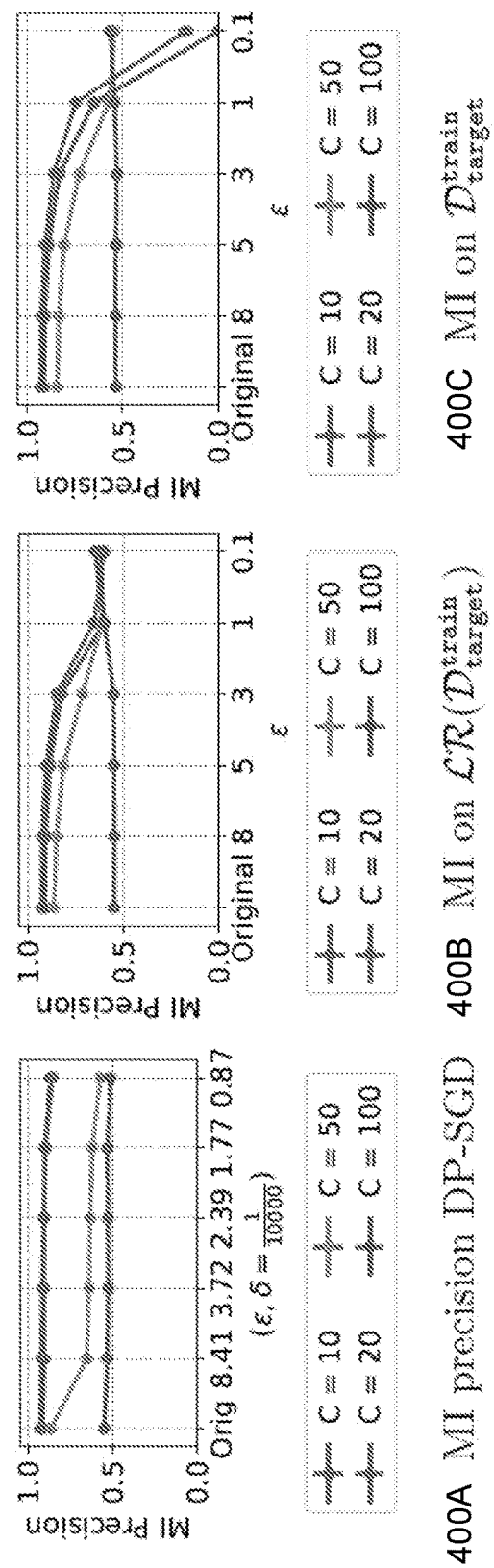
FIG. 4 characterizes data owner privacy analysis including a first diagram illustrating membership inference precision using differential privacy stochastic gradient descent, a second diagram illustrating membership inference on local randomizer as applied to a training data set, and a third diagram illustrating membership interference on the training data set.

As used herein, the unperturbed MI attack can be referred to as original and can provide target model train and test accuracy and MI precision in diagram 300A of FIG. 3 and diagram 400A of FIG. 4. Diagram 300A of FIG. 3 presents a foundation for $\mathcal{DO}$ utility analysis by stating target model train and test accuracy over $$\left(\epsilon, \delta = \frac{1}{10,000}\right).$$

While learning problems C (e.g., 'target models discriminate between C∈{10,20,50,100} customer groups', etc.) suffer from a decreasing test error, the decrease is close to linear for relatively easier learning problems of C∈{10, 20}. For complex learning C∈{50,100} the decrease is strong already at small perturbation and only sublinear for stronger $\epsilon$.

Chart 400A of FIG. 4 illustrates the changes in MI precision over privacy guarantees $$\left(\epsilon, \delta = \frac{1}{10,000}\right).$$

Privacy comes indeed at a heavy cost in this deployment: DP-SGD weakens the $\mathcal{A}$ while significantly hurting the $\mathcal{DO}$ test accuracy. In summary, it is observed that DP-SGD has to be calibrated carefully to preserve $\mathcal{DO}$''s test accuracy (e.g., for C=50).

In the LDP setup $\mathcal{D}^{train}$ is protected by the application of randomized response (cf. Equation (1)) to every position in all feature vectors. Randomized response thus serves as a local randomizer $\mathcal{LR}$ (cf. Definition 4) and we denote the series of repeated executions $\mathcal{LR}$ ($d \in \mathcal{D}^{train}$) as $\mathcal{LR}$ ($\mathcal{D}^{train}$). The target model is trained with a standard optimizer (e.g., SGD) on $\mathcal{LR}$ $\mathcal{D}(_{target}^{train}) \subset \mathcal{LR}$ ($\mathcal{D}^{train}$). Perturbation using LDP affects $\mathcal{A}$ since the direct application of the MI attack against a model trained on the perturbed dataset $\mathcal{LR}$ ($\mathcal{D}_{target}^{train}$) should solely provide A with information about the underlying LDP data due to the post-processing proposition (cf. Proposition 1). The privacy in our experiment is evaluated by $\mathcal{A}$''s MI precision on (i) $\mathcal{LR}$ ($\mathcal{D}_{target}^{train}$), and (ii) original $\mathcal{D}_{target}^{train}$.

Again, the first evaluation aspect is $\mathcal{DO}$''s test accuracy. A main difference to address for this analysis is, that in contrast to the DP-SGD parameters ($\epsilon$, $\delta$) for LDP, $\epsilon_i$ resulting from the execution of randomized response as $\mathcal{LR}$ per attribute can be considered. The privacy after repeated executions of $\mathcal{LR}$ is measured by a local algorithm LA (cf. Definition 5), yielding $\epsilon = \Sigma_{i=1}^{600} \epsilon_i$ per $d \in (\mathcal{D}_{target}^{train})$. Evaluation can be provided for diverse $\epsilon_i \in \{8, 5, 3, 1, 0.1\}$. These $\epsilon_i$ cover a wide range of retention probabilities p, i.e., the probability of retaining the true value (cf. Equation 1), from low $\rho_{\epsilon_i=0.1} \leq 0.31$ to high $\rho_{\epsilon_g} \leq 0.98$. FIG. 300B of FIG. 3 indicates that especially simple classification tasks (e.g., C∈{10, 20}), where n is much larger than the dimensionality l of the training data, $\mathcal{D}$''s test accuracy seems relatively robust to noise.

Again, for privacy, the protection of $\mathcal{DO}$''s training data is evaluated by $\mathcal{A}$''s MI attack precision.

For MI against $\mathcal{LR}$ ($\mathcal{D}_{target}^{train}$) diagram 400B of FIG. 4 demonstrates that the drop in MI precision is larger than the drop in target model accuracy (cf. diagram 300B of FIG. 3) caused by LDP. The reasons for this drop are located in the lower target model softmax confidences for classifications when LDP is applied. This decrease in confidence leads to fewer predictions overcoming the threshold exploited by $\mathcal{A}$, and thus, MI precision drops. For the more complex classification task C=50, a drop in MI precision as the train-test-gap closes is observed. It can be assumed that $D^{train}$ becomes similar to $D^{test}$ due to LDP and the attacker categorizes more data entries as "in". However, the evaluation before only indicates $\mathcal{DO}$''s MI risk with regard to $\mathcal{LR}$ ($\mathcal{D}_{target}^{train}$).

A more accurate expression of risk should address records of the original $\mathcal{D}_{target}^{train}$. When providing original records $d \in \mathcal{D}_{target}^{train}$ to $\mathcal{A}$''s trained attack model as test records, instead of LDP training data, the intuition is that A should not be able to achieve meaningful precision on this data due to the protection of LDP. Indeed this clearly holds for C∈{10, 20} in diagram 400B of FIG. 4. Thus, the actual effect of LDP on MI is even stronger.

When comparing to DP-SGD, a striking difference is that the reason for the decrease of $\mathcal{A}'$'s MI precision in LDP is due to the noisy $\mathcal{LR}$ ($D_{target}^{train}$), rather than the noisy gradients. Thus, the training dataset itself already enjoys DP protection and the records detected under MI do not represent original data anymore. The evaluation within this section has shown that LDP affects $\mathcal{A}'$'s MI precision, and that the protection for original data can be even higher. The difference between LDP and DP-SGD privacy guarantees $\epsilon$ and ($\epsilon$, $\delta$) also suggests that the privacy guarantee should not be directly compared and a discussion is required.

Figure 5:
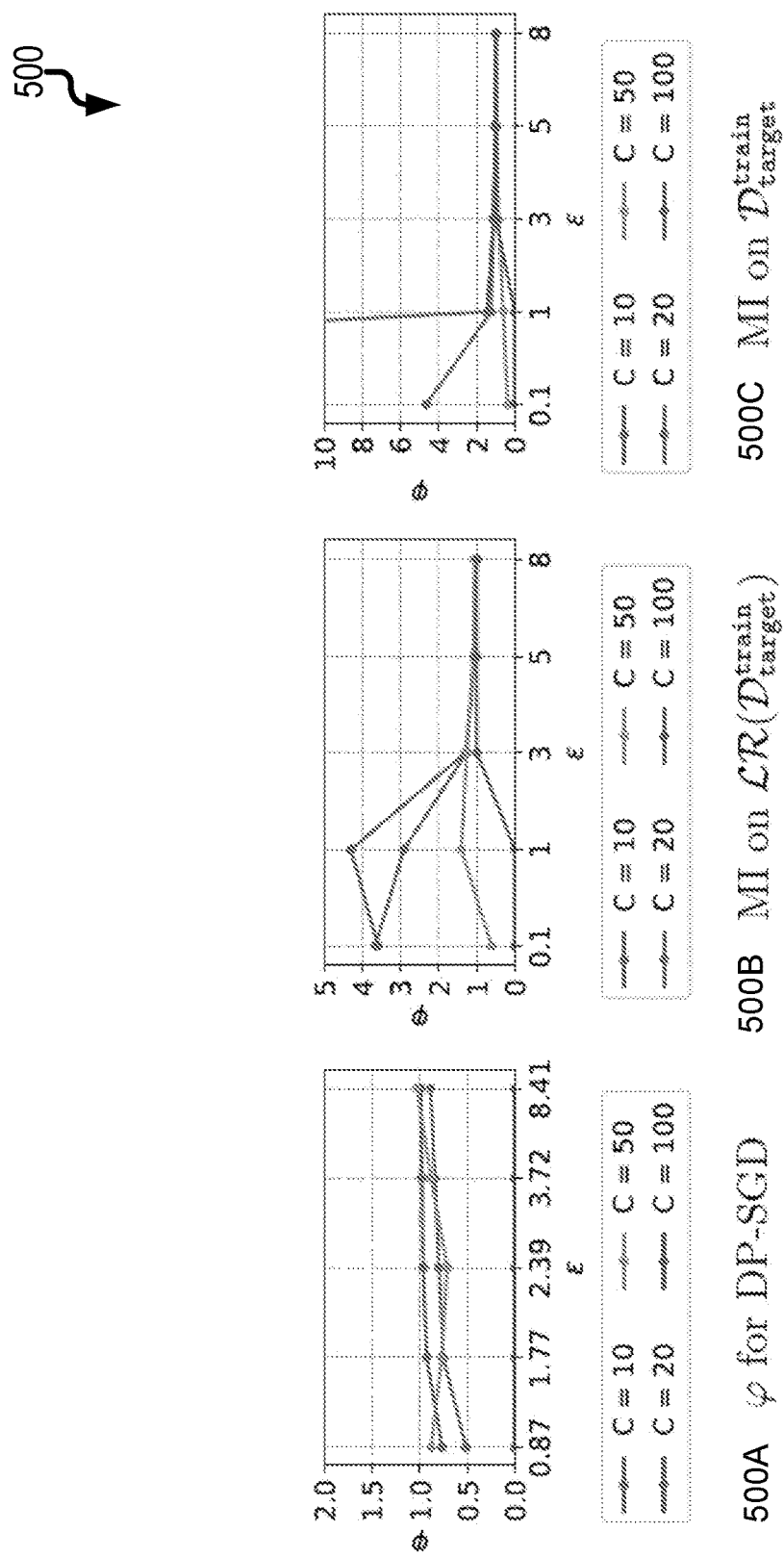
FIG. 5 characterizes φ including a first diagram illustrating membership inference precision using differential privacy stochastic gradient descent, a second diagram illustrating membership inference precision on local randomizer as applied to a training data set, and a third diagram illustrating membership interference precision on the training data set.

The difference in utility and privacy between LDP and DP-SGD is also observable with regard to $\varphi$, where $\mathcal{DO}'$'s test accuracy is weakened more than $\mathcal{A}'$'s MI precision when $\varphi<1$ for a given ($\epsilon$, $\delta$). FIG. 500A illustrates that for DP-SGD our experiments did not yield $\varphi>1$ for any ($\epsilon$, $\delta$). This supports our first impression that DP-SGD impacts $\mathcal{DO}'$'s test accuracy stronger than the MI precision. In contrast, chart 500B of FIG. 5 presents that when LDP is utilized for some $\epsilon$ there is $\varphi>1$. Counterintuitively, higher $\varphi$ values are observed for small $\in$ for $C\in\{10, 20\}$ due to an increased test accuracy. Here, LDP achieves a regularization effect. In contrast, increased target model test accuracies for DP-SGD on the same data were not observed. Finally, diagram 500C of FIG. 5 points out that for $C\in\{10, 20\}$ and $\epsilon=0.1$ LDP can lead to even stronger protections for $\mathcal{D}_{target}^{train}$. MI precision close to $\varphi$ leading to large (o values is observed. However, to achieve this LDP has to be calibrated carefully. The difference in values for $\varphi$ in diagram 500B of FIG. 5 is mostly due to a different baseline line MI precision. Instead of performing random guessing, leading to a baseline MI precision of 0.5, $\mathcal{A}'$'s attack model will label records "in" only when they are similar to the LDP data that has been used for training of the attack model. In the extreme case where LDP records are very different to the original records MI precision close to 0 was observed.

Furthermore, diagram 500 of FIG. 5 illustrates that a sole comparison of privacy parameters ($\epsilon$, $\delta$) is not sufficient to evaluate potential privacy risks, e.g., due to MI attacks. While utilizing larger privacy guarantees $\in$, LDP is able to achieve better $\varphi$, i.e., a better ratio between privacy and model utility. This stresses $\mathcal{DO}'$'s need for key figures like $\varphi$ to support the decision making process Differential Privacy protects training data by anonymization and allows quantification of the resulting privacy loss. However, a direct comparison of the DP guarantees ($\epsilon$, $\delta$) falls short of measuring factual privacy risks under sophisticated attacks like MI. Furthermore, the parameters ($\epsilon$, $\delta$) do not have the same meaning between different DP mechanisms. Extending the DS process with steps for defining acceptable MI risk, enforcing DP and interpreting the resulting efficiency of various ($\epsilon$, $\delta$) parameters with $\varphi$ eases this constraint and gives data scientists guidance in their decision making.

As can be appreciated above, the data science process of FIG. 1 covers two machine learning development cases that are relevant for many model providers and data scientists. First, the process of FIG. 1 allows data scientists to design and interpret machine learning models that protect the training data and to communicate risks towards third-parties who are participating in the training data. These trained models can then be deployed to third parties, either as part of an application or as a prediction service, while the trade-off between privacy and utility due to the enforced mechanism is quantified by $\varphi$. Second, it enables third parties to train models that are shipped to them and interpret the respective risk that their training data is facing under MI.

Figure 6:
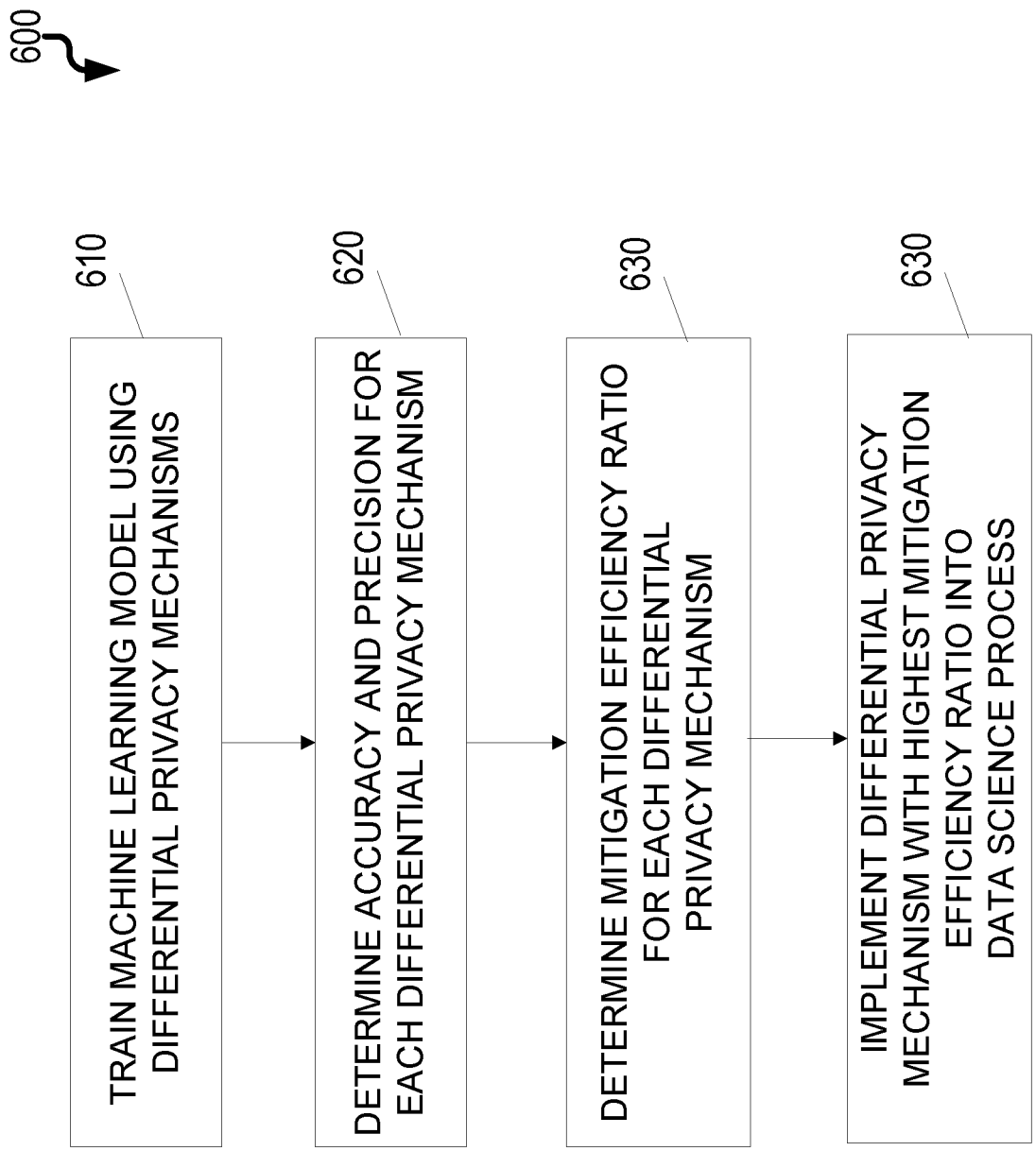
FIG. 6 is a process flow diagram illustrating techniques for applying differential privacy to prevent machine learning model membership inference.

FIG. 6 is a process flow diagram 600 illustrating a method for maintaining machine learning model data privacy in which, at 610, a machine learning model forming part of a data science process is trained using data anonymized using each of two or more differential privacy mechanisms. Thereafter, at 620, a level of accuracy and a level of precision are determined for each of the two or more differential privacy mechanisms when evaluating data with known classifications. It can later be determined, at 630, using the respective determined levels of precision and accuracy, a mitigation efficiency ratio for each of the two or more differential privacy mechanisms. The differential privacy mechanism having the highest mitigation efficiency can, at 640, be incorporated into the data science process along with its parameters.

Figure 7:
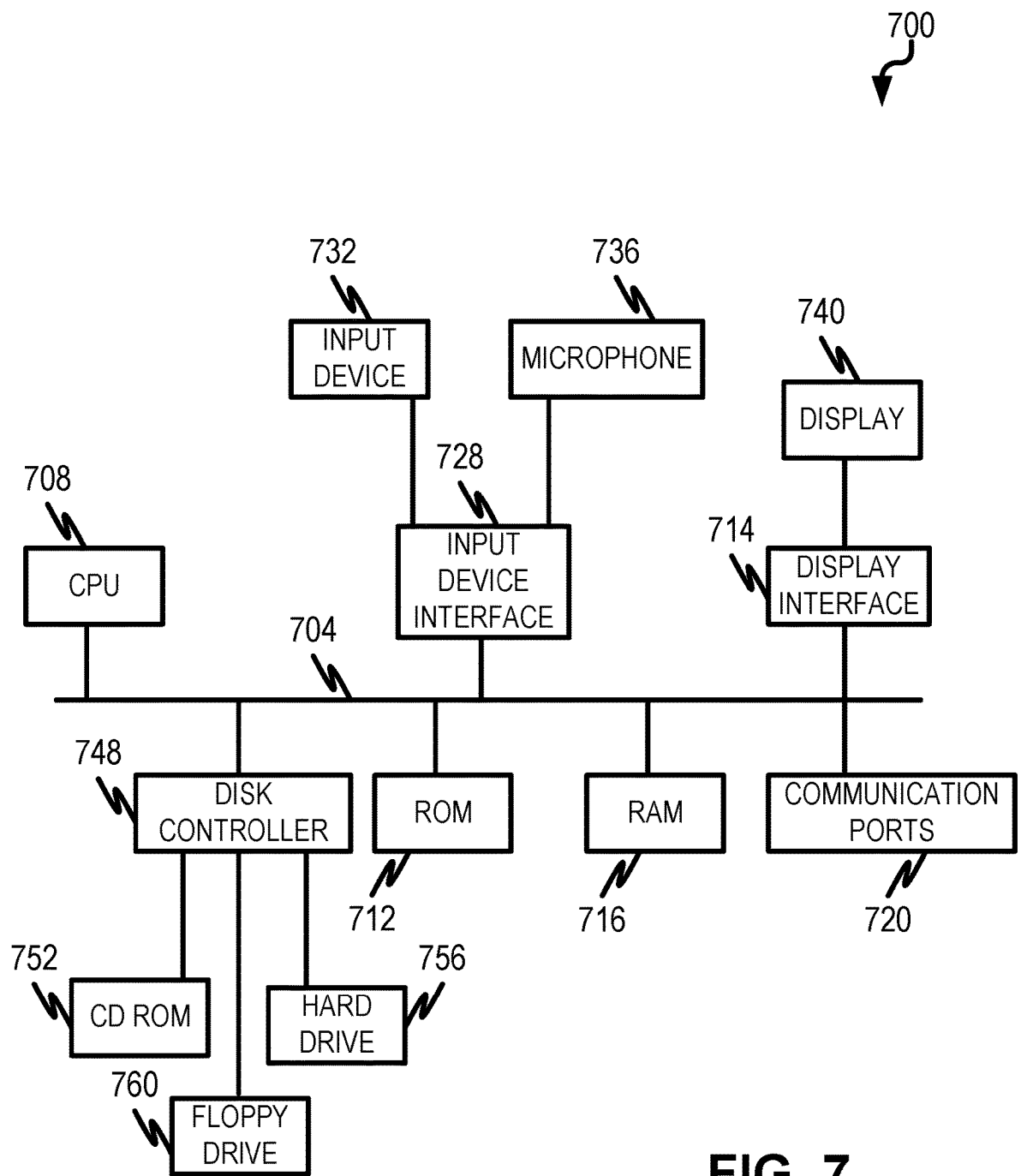
FIG. 7 is a diagram illustrating aspects of a computing device for implementing the subject matter provided herein.

FIG. 7 is a diagram 700 illustrating a sample computing device architecture for implementing various aspects described herein. A bus 704 can serve as the information highway interconnecting the other illustrated components of the hardware. A processing system 708 labeled CPU (central processing unit) (e.g., one or more computer processors/data processors at a given computer or at multiple computers), can perform calculations and logic operations required to execute a program. A non-transitory processor-readable storage medium, such as read only memory (ROM) 712 and random access memory (RAM) 716, can be in communication with the processing system 708 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 748 can interface with one or more optional disk drives to the system bus 704. These disk drives can be external or internal floppy disk drives such as 760, external or internal CD-ROM, CD-R, CD-RW or DVD, or solid state drives such as 752, or external or internal hard drives 756. As indicated previously, these various disk drives 752, 756, 760 and disk controllers are optional devices. The system bus 704 can also include at least one communication port 720 to allow for communication with external devices either physically connected to the computing system or available externally through a wired or wireless network. In some cases, the at least one communication port 720 includes or otherwise comprises a network interface.

To provide for interaction with a user, the subject matter described herein can be implemented on a computing device having a display device 740 (e.g., a CRT (cathode ray tube) or LCD (liquid crystal display) monitor) for displaying information obtained from the bus 704 via a display interface 714 to the user and an input device 732 such as keyboard and/or a pointing device (e.g., a mouse or a trackball) and/or a touchscreen by which the user can provide input to the computer. Other kinds of input devices 732 can be used to provide for interaction with a user as well; for example, feedback provided to the user can be any form of sensory feedback (e.g., visual feedback, auditory feedback by way of a microphone 736, or tactile feedback); and input from the user can be received in any form, including acoustic, speech, or tactile input. The input device 732 and the microphone 736 can be coupled to and convey information via the bus 704 by way of an input device interface 728. Other computing devices, such as dedicated servers, can omit one or more of the display 740 and display interface 714, the input device 732, the microphone 736, and input device interface 728.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touch screen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method of training a machine learning model, the method comprising:
   accessing a first data set;
   producing a first anonymized data set from the first data set by applying a first differential privacy mechanism to the first data set using a first set of privacy parameters;
   producing a second anonymized data set from the first data set by applying a second differential privacy mechanism using a second set of privacy parameters;
   accessing a first version of the machine learning model;
   training a second version of the machine learning model using the first anonymized data set;
   training a third version of the machine learning model using the second anonymized data set;
   calculating a first mitigation efficiency ratio for the second version of the machine learning model, the first mitigation efficiency ratio being a ratio of change in accuracy between the first version of the machine learning model and the second version of the machine learning model and change in precision between the first version of the machine learning model and the second version of the machine learning model;
   calculating a second mitigation efficiency ratio for the third version of the machine learning model, the second mitigation efficiency ratio being a ratio of change in accuracy between the first version of the machine learning model and the third version of the machine learning model and change in precision between the first version of the machine learning model and the third version of the machine learning model;
   selecting the version of the machine learning model having a higher calculated mitigation efficiency ratio; and
   distributing the selected version of the machine learning model and the set of privacy parameters used to produce the anonymized data set used to train the selected version of the machine learning model to an entity in a manner that permits the entity to retrain the selected version of the machine learning model using the set of privacy parameters used to produce the anonymized data set used to train the selected version of the machine learning model.

2. The method of claim 1, wherein the first mitigation efficiency ratio is defined as $\varphi$, wherein:

$$\varphi = \frac{\frac{\text{largest change accuracy} - \text{actual change accuracy}}{\text{largest change accuracy}}}{\frac{\text{largest change precision} - \text{actual change precision}}{\text{largest change precision}}}$$

3. The method of claim 1, wherein the first differential privacy mechanism comprises local differential privacy (LDP).

4. The method of claim 3, wherein the LDP is realized using local randomizers.

5. The method of claim 1, wherein the second differential privacy mechanism comprises differential privacy stochastic descent gradient (DP-SGD).

6. The method of claim 1, wherein the set of privacy parameters used to train the selected version of the machine learning model is also used in a privacy negotiation stage.

7. The method of claim 1, wherein the set of privacy parameters used to train the selected version of the machine learning model is also used in a data preparation stage.

8. A system for training a machine learning model, comprising:
at least one data processor; and
memory storing instructions which, when executed by the at least one data processor, result in operations comprising:
accessing a first data set;
producing a first anonymized data set from the first data set by applying a first differential privacy mechanism to the first data set using a first set of privacy parameters;
producing a second anonymized data set from the first data set by applying a second differential privacy mechanism using a second set of privacy parameters;
accessing a first version of the machine learning model;
training a second version of the machine learning model using the first anonymized data set;
training a third version of the machine learning model using the second anonymized data set;
calculating a first mitigation efficiency ratio for the second version of the machine learning model, the first mitigation efficiency ratio being a ratio of change in accuracy between the first version of the machine learning model and the second version of the machine learning model and change in precision between the first version of the machine learning model and the second version of the machine learning model;
calculating a second mitigation efficiency ratio for the third version of the machine learning model, the second mitigation efficiency ratio being a ratio of change in accuracy between the first version of the machine learning model and the third version of the machine learning model and change in precision between the first version of the machine learning model and the third version of the machine learning model;

selecting the version of the machine learning model having a higher calculated mitigation efficiency ratio; and
distributing the selected version of the machine learning model and the set of privacy parameters used to produce the anonymized data set used to train the selected version of the machine learning model to an entity in a manner that permits the entity to retrain the selected version of the machine learning model using the set of privacy parameters used to produce the anonymized data set used to train the selected version of the machine learning model.

9. The system of claim 8, wherein the first mitigation efficiency ratio is defined as $\varphi$, wherein:

$$\varphi = \frac{\frac{\text{largest change accuracy} - \text{actual change accuracy}}{\text{largest change accuracy}}}{\frac{\text{largest change precision} - \text{actual change precision}}{\text{largest change precision}}}$$

10. The system of claim 8, wherein the first differential privacy mechanism comprises local differential privacy (LDP).

11. The system of claim 10, wherein the LDP is realized using local randomizers.

12. The system of claim 8, wherein the second differential privacy mechanism comprises differential privacy stochastic descent gradient (DP-SGD).

13. The system of claim 8, wherein the set of privacy parameters used to train the selected version of the machine learning model is also used in a privacy negotiation stage.

14. The system of claim 8, wherein the set of privacy parameters used to train the selected version of the machine learning model is also used in a data preparation stage.

15. A non-transitory machine-readable storage medium comprising instructions which, when implemented by one or more machines, cause the one or more machines to perform operations training a machine learning model, comprising:
accessing a first data set;
producing a first anonymized data set from the first data set by applying a first differential privacy mechanism to the first data set using a first set of privacy parameters;
producing a second anonymized data set from the first data set by applying a second differential privacy mechanism using a second set of privacy parameters;
accessing a first version of the machine learning model;
training a second version of the machine learning model using the first anonymized data set;
training a third version of the machine learning model using the second anonymized data set;
calculating a first mitigation efficiency ratio for the second version of the machine learning model, the first mitigation efficiency ratio being a ratio of change in accuracy between the first version of the machine learning model and the second version of the machine learning model and change in precision between the first version of the machine learning model and the second version of the machine learning model;

calculating a second mitigation efficiency ratio for the third version of the machine learning model, the second mitigation efficiency ratio being a ratio of change in accuracy between the first version of the machine learning model and the third version of the machine learning model and change in precision between the first version of the machine learning model and the third version of the machine learning model;

selecting the version of the machine learning model having a higher calculated mitigation efficiency ratio; and distributing the selected version of the machine learning model and the set of privacy parameters used to produce the anonymized data set used to train the selected version of the machine learning model to an entity in a manner that permits the entity to retrain the selected version of the machine learning model using the set of privacy parameters used to produce the anonymized data set used to train the selected version of the machine learning model.

16. The non-transitory machine-readable storage medium of claim 15, wherein the first mitigation efficiency ratio is defined as φ, wherein:

$$\varphi = \frac{\frac{\text{largest change accuracy} - \text{actual change accuracy}}{\text{largest change accuracy}}}{\frac{\text{largest change precision} - \text{actual change precision}}{\text{largest change precision}}}.$$

17. The non-transitory machine-readable storage medium of claim 15, wherein the first differential privacy mechanism comprises local differential privacy (LDP).

18. The non-transitory machine-readable storage medium of claim 17, wherein the LDP is realized using local randomizers.

19. The non-transitory machine-readable storage medium of claim 15, wherein the second differential privacy mechanism comprises differential privacy stochastic descent gradient (DP-SGD).

20. The non-transitory machine-readable storage medium of claim 15, wherein the set of privacy parameters used to train the selected version of the machine learning model is also used in a privacy negotiation stage.

* * * * *